United States Patent
Madden

(10) Patent No.: US 8,809,681 B2
(45) Date of Patent: Aug. 19, 2014

(54) POWER UMBILICAL

(75) Inventor: David Madden, League City, TX (US)

(73) Assignee: Technip France (FR)

( * ) Notice: Subject to any disclaimer, the term of this patent is extended or adjusted under 35 U.S.C. 154(b) by 41 days.

(21) Appl. No.: 13/512,822

(22) PCT Filed: Nov. 30, 2010

(86) PCT No.: PCT/US2010/058316
§ 371 (c)(1),
(2), (4) Date: Jun. 11, 2012

(87) PCT Pub. No.: WO2011/066530
PCT Pub. Date: Jun. 3, 2011

(65) Prior Publication Data
US 2012/0234597 A1      Sep. 20, 2012

Related U.S. Application Data

(60) Provisional application No. 61/265,188, filed on Nov. 30, 2009.

(51) Int. Cl.
*H02G 15/02* (2006.01)
*F16L 11/00* (2006.01)

(52) U.S. Cl.
USPC .... 174/74 R; 174/47; 174/110 R; 174/113 R; 174/89

(58) Field of Classification Search
USPC ............ 174/47, 15.6, 15.7, 19, 113 C, 113 A, 174/102 R, 70 R, 116, 103, 31 R, 74 R, 89, 174/152 R, 110 R, 113 R; 385/105, 110, 112, 385/114, 101; 138/113; 439/453, 454, 455
See application file for complete search history.

(56) References Cited

U.S. PATENT DOCUMENTS

| | | | |
|---|---|---|---|
| 3,017,452 A | 1/1962 | Rongved | |
| 3,898,372 A | 8/1975 | Kalb | |
| 4,758,174 A | 7/1988 | Michaels et al. | ............. 439/281 |
| 5,758,174 A | 5/1998 | Crump et al. | |
| 6,180,232 B1 | 1/2001 | McCullough et al. | |
| 6,388,197 B1 | 5/2002 | Zhao et al. | |
| 6,472,614 B1 | 10/2002 | Dupont et al. | |

(Continued)

FOREIGN PATENT DOCUMENTS

| | | |
|---|---|---|
| GB | 2316990 | 3/1998 |
| WO | WO 93/17176 | 9/1993 |

(Continued)

OTHER PUBLICATIONS

Patent Examination Report No. 1 issued in corresponding Australian Application No. 2010324620 issued Jul. 3, 2013.

(Continued)

*Primary Examiner* — Angel R Estrada
(74) *Attorney, Agent, or Firm* — Ostrolenk Faber LLP

(57) ABSTRACT

An umbilical for use, for example, in deep water applications includes a plurality of power cables and may include other elements bundled together and within a sheath. An end termination at each of the power cables or at a plurality of the power cables includes a resin ferrule around the cable at the end termination and provides a connection between the cable and an installation to which the umbilical is connected.

15 Claims, 13 Drawing Sheets

(56) References Cited

U.S. PATENT DOCUMENTS

| | | | |
|---|---|---|---|
| 7,158,703 B2* | 1/2007 | Mjelstad | 385/101 |
| 7,229,325 B1 | 6/2007 | Flynn et al. | |
| 7,485,811 B2* | 2/2009 | Mjelstad | 174/113 R |
| 7,754,966 B2* | 7/2010 | Figenschou | 174/47 |
| 7,798,234 B2* | 9/2010 | Ju et al. | 174/47 |
| 8,008,577 B2* | 8/2011 | Lima et al. | 174/113 R |
| 8,304,651 B2* | 11/2012 | Figenschou et al. | 174/47 |
| 2011/0147047 A1 | 6/2011 | Madden | |

FOREIGN PATENT DOCUMENTS

| | | |
|---|---|---|
| WO | WO 03/091008 | 11/2003 |
| WO | WO 2005/124213 | 12/2005 |
| WO | WO 2008/037962 A1 | 4/2008 |
| WO | WO 2009/145906 A1 | 12/2009 |

OTHER PUBLICATIONS

International Preliminary Report on Patentability dated May 17, 2012 issued in corresponding international patent application No. PCT/US2010/058316.

International Search Report and Written Opinion dated Feb. 7, 2011 issued in corresponding international patent application No. PCT/US2010/058316.

"Specification for Subsea Umbilicals", API Specification 17E, Third Edition, Jul. 2003.

* cited by examiner

FIG. 4 Ferrule to conductor coupling concepts

POWER UMBILICAL

CROSS REFERENCE TO RELATED APPLICATION

The present application is a 35 U.S.C. §371 National Phase conversion of PCT/EP2010/058316, filed Nov. 30, 2010, which claims the benefit of U.S. Provisional Application Ser. No. 61/265,188, filed Nov. 30, 2009, entitled POWER UBILICAL, the entire disclosures of which are incorporated herein by reference in their entirety. The PCT International Application was published in the English language. of which is incorporated herein by reference in its entirety.

BACKGROUND OF THE INVENTION

The present invention relates to an umbilical or power cable that is used in an offshore application such as oil and gas field developments, subsea pumping, processing and renewable energy installations.

An umbilical consists of a group of one or more types of elongated active umbilical elements, such as electrical cables, optical fiber cables, steel pipes and/or hoses, cabled together for flexibility, over-sheathed and, when applicable, armored for mechanical strength. Umbilicals are typically used for transmitting power, signals and fluids (for example for fluid injection, hydraulic power, gas release, etc.) to and from a subsea installation.

The umbilical cross-section is generally circular. The elongated elements of the umbilical are wound together either in a helical or in a S/Z pattern. In order to fill the interstitial voids between the various umbilical elements and obtain the desired configuration for the umbilical, filler components may be included within the voids.

ISO 13628-5/API (American Petroleum Institute) 17E "Specification for Subsea Umbilicals", provides standards for the design and manufacture of such umbilicals.

Subsea umbilicals are installed at increasing water depths, commonly deeper than 2000 m. Such umbilicals have to be able to withstand severe loading conditions during their installation and their service life.

The main load bearing components in use for withstanding the axial loads due to the weight and to the movements of the umbilical are steel pipes (see U.S. Pat. No. 6,472,614, WO93/17176 and GB2316990), steel rods (see U.S. Pat. No. 6,472,614), composite rods (see WO2005/124213), tensile armor layers (see FIG. 1 of U.S. Pat. No. 6,472,614), or steel wire ropes.

The other elements of the umbilical, i.e. the electrical and optical cables, the thermoplastic hoses, the polymeric external sheath and the polymeric filler components do not contribute significantly to the tensile strength of the umbilical.

Electrical cables used in subsea umbilicals fall into two distinct categories respectively known as power cables and signal cables. Power cables are used for transmitting high electrical power (typically a few MW) to powerful subsea equipments such as pumps. Power cables are rated at voltages comprised between 1 kV and 200 kV, and generally between 6 kV and 35 kV (medium voltage range).

Signal cables are generally used for transmitting signals and low power (<1 kW) to electrical devices on the seabed. Signal cables are generally rated at a voltage smaller than 3000V, and typically smaller than 1000V.

An umbilical comprising at least one power cable is called a power umbilical. Thus, a power umbilical includes one or more electrical power cables formed from one or more conductors.

The conductors of these power cables within the subsea power umbilical are copper as specified in ISO 13628-5. They are not load bearing components, because of the low tensile strength and high specific gravity of copper. These heavy copper conductors add considerable weight to the umbilical and have very poor load carrying capacity, thus limiting the sea depth that the umbilical can be deployed at. Unless protected, these electrical conductors may be damaged by excessive elongation or crushing especially under severe conditions such as in deep water and/or dynamic umbilicals.

An object of the present invention is to solve this problem and provide a power umbilical in dynamic or deep water applications.

SUMMARY OF THE INVENTION

The invention concerns a hang-off termination of an umbilical comprising at least one power cable. The power cable comprises a high tensile strength electrical conductor. The power cable conductor of the present invention has two functions, namely transmitting electrical power and partially withstanding the tensile load applied to the umbilical. Umbilicals comprising power cable conductors combining these two functions are not known.

One aspect of the invention is to replace the copper conductors of the power cables by conductors made of a high strength material having a tensile strength to density ratio greater than copper, for example, high strength aluminum grades, metal matrix composites, or carbon fiber composite reinforced conductors. Such conductors are used for overhead power transmission (see U.S. Pat. No. 6,180,232) and are strong and light enough to be able to withstand their own suspended weight in water. Furthermore, these conductors can be used as load bearing elements which partially withstand the tensile loads applied to the umbilical. This solution decreases the tensile loads applied to the other load carrying components (steel pipes, steel or composite ropes, steel or composite rods, steel or composite armors), and therefore increases the tensile strength of the umbilical and/or makes it possible to reduce its weight by removal of some of the other load carrying elements.

The tensile loads applied to an umbilical riser extending from the sea bed up to a host vessel/platform are maximum at the topside termination area (hang-off termination). The deeper is the water, the longer and heavier is the umbilical riser, and the greater is the top side tensile load. Therefore, for deep water, it is advantageous to utilize the tensile strength of such high strength conductors on their own or in combination with the other tensile strength components (armors, rods or tubes) contained in the umbilical.

In the present specification, a core is defined as an insulated conductor. Sometimes a cable can be considered to be a collection of insulated conductors (cores) or an insulated and screened conductor. The invention applies to any kinds and shapes of high strength conductor materials including metals, metal combinations, high strength alloys and all composites, metallic and/or non metallic. It also applies to all conductor types which may be shaped, stranded, circular, solid, or composite including some or all of the above.

A high strength conductor as referred to herein should have an electrical conductivity higher than 35% IACS (International Annealed Copper Standards), more preferable higher than 40% IACS, and most preferably higher than 45% IACS, which makes these conductors suitable for transporting electrical power on long distances with small losses.

The lower the electrical conductivity of the conductor, the larger its cross-section to achieve the same power transmission function, the cross-section being conversely proportional to the conductivity. For example, if the electrical conductivity of the conductor is 35% IACS then its cross-section should be 1/0.35≈2.86 larger than the cross-section of an equivalent annealed copper conductor. Conductors with a conductivity smaller than 35% IACS have to be avoided in order not to increase too much the diameter of the conductors of the umbilical.

Because of their low density and high tensile strength, high strength conductors can withstand their suspended weight without any armoring in much deeper water depth than copper conductors. The maximum theoretical water depth Dm (in meters) that can reach a vertically suspended non reinforced conductor can be expressed as (SI units):

$$Dm = Ys/((\rho - 1000)*9.81)$$

where Ys is the conductor tensile yield strength in Pa and ρ is the conductor density in kg/m3. This formula takes into account the Archimedes buoyant force which reduces the apparent weight of the immerged conductor. Around this water depth limit Dm, the tensile stress applied to the conductor at the topside point close to the surface reaches the yield strength. The maximum theoretical water depth Dm that would be able to reach a vertically suspended non reinforced conductor is only around 775 m for standard annealed copper having a yield strength around 60 MPa and a density around 8900 kg/m$^3$. As a consequence, copper cables are not able to withstand their own suspended weight in deep water applications (1000 m and deeper, commonly more than 2000 m), and have therefore to be armored with steel or composite wires.

A "high strength conductor" according to the present invention is able to reach without any reinforcement a maximum theoretical water depth Dm higher than 4000 m, preferably higher than 6000 m, and more preferably higher than 10000 m. As a consequence, this high strength conductor can easily withstand without armoring its own suspended weight in water depths up to 4000 m, and its important load carrying capacity can be shared with the other components of the umbilical to reduce the load in said other components.

The tensile yield strength Ys of the "high strength conductor" is preferably higher than 170 MPa. The density p of the "high strength conductor" is preferably smaller than 3500 kg/m$^3$, more preferably smaller than 3000 kg/m$^3$. Naturally, reducing the density of the conductor would reduce the weight of the umbilical.

Thus, a "high strength conductor" as referred to herein is an electrical conductor having an electrical conductivity higher than 35% IACS and a Dm (calculated according to the formula set forth above) larger than 4000 m.

According to a first embodiment of the first aspect of the invention, the "high strength conductor" comprises high strength aluminum strands, preferably 6000 series aluminum stands. The 6000 series aluminum alloys are wrought aluminum alloys alloyed with magnesium (Mg) and silicon (Si). They are defined in the European Standard EN 573-1 "Aluminum and aluminum alloys—Chemical composition and form of wrought products—Part 1: Numerical designation system". The four-digits numerical designation system specified in this European Standard is in accordance with the International Alloy Designation System (IADS) developed by the Aluminum Association, Arlington Va. 22209, USA. The first of the four digits in the EN 573/IADS designation system indicates the major alloying elements of the aluminum or aluminum alloy. When it is equal to 1, the corresponding material belongs to the 1000 series and is almost pure wrought aluminum, i.e. comprising 99% or more aluminum. When it is equal to 6, the corresponding material is an aluminum alloy belonging to the 6000 series, and its major alloying elements are magnesium and silicon, which form $Mg_2Si$ precipitate to give better mechanical properties after heat treatment.

The wrought aluminum alloys belonging to the 6000 series have high mechanical properties (yield strength Ys around 200 MPa, tensile strength higher than 250 MPa) and a good electrical conductivity (49% IACS), which is the reason why some of these materials are used for uninsulated overhead lines. Because of their low density (2700 kg/m$^3$) and high tensile strength, these conductors can withstand their suspended weight without any armoring in much deeper water depths than copper conductors. Their theoretical water depth limit Dm is around 12000 m.

Copper conductors have a very good electrical conductivity, around double that of aluminum conductors, which is the main reason why copper is generally preferred to aluminum for power cable applications. However, the density of copper (around 8900 kg/m$^3$) is much higher than the one of aluminum (around 2700 kg/m$^3$). The Dm of a copper conductor is around 774 meters (assuming Ys=60 MPa). Furthermore, due to the Archimedes buoyant force, the relative weight difference between aluminum and copper is much more important in water (Equivalent weights respectively equal to 1700 kg/m$^3$ and 7900 kg/m$^3$, ratio of 4.65 between these values) than in air (Densities respectively equal to 2700 kg/m$^3$ and 8900 kg/m$^3$, ratio of 3.3 between these values). Therefore, for a given operating current and linear conductivity, the cross-section area of an aluminum conductor has to be almost the double of the one of the equivalent copper conductor, but the total weight in water of said aluminum conductor is only around 45% of the one of said equivalent copper conductor. Given the fact that the power cables conductors are the heaviest components in a power umbilical, replacing copper by aluminum makes it possible to reduce significantly the weight of the power umbilical.

Preferably, some or all the 6000 series aluminum stands of the "high strength conductor" are made with an aluminum alloy designated 6101 or 6101-A or 6101-B, or 6201 or 6201-A, as defined in the "International Alloy Designations and Chemical Composition Limits for Wrought Aluminum and Wrought Aluminum Alloys" issued by the Aluminum Association, Arlington Va. 22209, USA. These materials are those of the 6000 series having the best electrical conductivity. The 6101, 6101-A and 6101-B grades comprise 0.3%-0.7% Si and 0.35%-0.9% Mg in addition to 0.1%-0.5% Fe, 0.05%-0.1% Cu, and to small amount of Mn, Cr Zn, and B impurities. The 6201 and 6201-A grades comprise 0.5-0.9% Si and 0.6%-0.9% Mg, in addition to 0.5% Fe, 0.04%-0.1% Cu, and to small amounts of Mn, Cr, Zn and B impurities. The 6201 and 6201-A aluminum alloys offer the better combination between mechanical, electrical and corrosion resistance properties.

According to a second embodiment of the first aspect of the invention, the "high strength conductor" comprises aluminum matrix composites such as those disclosed by U.S. Pat. No. 6,180,232. Such composite conductors are used for overhead power transmission because of their good conductivity, high strength and low density. A composite conductor relies on a core of aluminum composite wires surrounded by aluminum-zirconium strands. The composite core comprises metal matrix composite wires, each composite wire containing thousands of ultra-high strength micrometer sized alumina ($Al_2O_3$) fibers embedded within high purity aluminum. This composite core has a very high tensile strength (around 1350 MPa), a low density (around 3300 kg/m$^3$), and a medium conductivity (around 25% IACS). The aluminum-zirconium strands surrounding the composite core have a medium strength (Ys around 110 MPa), a low density (2700 kg/m$^3$) and a good conductivity (>60% IACS). The cross section of the aluminum-zirconium strands surrounding the composite core is much higher than the cross-section of the composite core, typically five times more. Therefore the whole composite conductor (composite core and surrounding aluminum-zirconium strands) has a high yield strength (Ys higher than 200 MPa), a low density (around 2800 kg/m$^3$) and a good electrical conductivity (around 55% IACS). The theoretical water depth limit Dm of such a high strength conductor is around 11300 meters.

According to a third embodiment of the first aspect of the invention, the "high strength conductor" comprises aluminum strands surrounding a composite non conductive core (See for example WO03/091008). This composite core comprises longitudinally oriented and substantially continuous high strength fibers embedded in a thermosetting resin matrix, said fibers being selected from the group consisting of carbon, glass, aramid, boron, liquid crystal fibers, high performance polyethylene and carbon nanofibers. This composite core has a very high tensile strength (more than 1700 MPa with carbon fibers) and a very low density (around 1600 kg/m$^3$ with carbon fibers). The cross-section of the composite core is much smaller than the cross-section of the surrounding aluminum strands, typically ten times less.

The second aspect of the invention is that when a high strength power core and/or cable is included in an umbilical, it is advantageous to mechanically connect the high strength conductor to the end termination of the umbilical, i.e. in the event of load share or self support of the cable/core. This is a means whereby the tensile strength of the conductor can be mechanically coupled to the end termination, while it is also electrically isolated from earth or ground potential.

The primary hang-off termination for an umbilical may include the terminations of armors, tubes and/or other tensile strength elements. Umbilical hang-off terminations generally comprise a cavity through which the elongated umbilical elements (tubes, reinforcing rods, cables, . . . ) pass, said cavity being filed with a hard setting compound (resin encapsulation). WO2008/037962 discloses such terminations. In these prior art solutions, the power cables are not strongly anchored to the hang-off termination and would not be able to withstand (especially over time) the high tensile loadings that the high strength electrical conductors of said power cables are able to withstand. Indeed, such power cable under high tension would slip longitudinally in the termination (risk of pulling out the power cable from its electrical connector) or have their polymeric layers (insulation layer and external sheath) overstressed and damaged (risk of short-circuit). However, these prior art solutions are able to safely withstand the radial loads and maintain the arrangement and separation of power cables/cores within the cavity filled with resin. It has been discovered that the axial loads applied onto the high strength conductors should be transferred to the 'secondary' hang-off position comprising suitable anchoring and insulation means, which is the focus of this aspect of the invention.

This invention is intended to apply mainly to the host vessel/platform end of an umbilical system, but it can equally apply to part of a subsea umbilical termination. This system can be used in conjunction with armored or unarmored umbilicals.

The invention uses the principle of a mechanically strong insulator which connects the cable to the umbilical pulling-head/hang-off device. The insulator may be designed to operate in either compression or in tension. The strength of the physical attachment between the cable and the insulator uses only the conductor to transfer the majority of axial loading. Any other small degree of load share through the remainder of the cable may be unavoidable by virtue of the final assembly method, but this is not the intention of the design.

Where the insulator is used in compression, the design employs the use of a retention collar in the form of a special 'shaped ferrule', cast into a resin conglomerate which has high compressive strength and good electrical insulating properties. This ferrule, when attached to the conductor, and cast into the resin, will offer a supporting system for the power cable. The tensile stress withstood by the high strength conductor of the power cable is transmitted to the hang-off termination body through the ferrule and the resin. The ferrule profile is designed to consider the mechanical forces exerted upon it as well as the electrical corona.

Where the insulator is used in tension, the design employs the use of a connection ferrule at one end of the insulator, and an anchoring feature at the other end. The ferrule is intended to capture the loading of the power cable conductor, and provide a terminal or break-out to which the electrical connection can be made. The electrical isolation from the connection ferrule and the anchoring feature is provided by the insulator, which also requires sufficient mechanical strength to accommodate the forces which will be transferred through it, to the hang-off termination. Some form of localized insulation will also be required in this region, so as to isolate the conductor from its surroundings.

Methods of attaching the conductor to the ferrule can be numerous and may include crimping, swaging, welding, soldering, brazing, CADwelding, bonding (using a conductive adhesive) or a basket socket with a conducting wedge(s).

Connection of the conductor to the ferrule requires the conductor insulation to be re-instated on one side (i.e. inboard towards the umbilical cable/core). On the outboard side, the conductor insulation can also be re-instated, or alternatively it may be designed to suit a custom termination which can be connected to commercially available accessories or equipment.

Other features and advantages of the present invention will become apparent from the following description of the invention which refers to the accompanying drawings.

DESCRIPTION OF CABLES AND OF A PREFERRED EMBODIMENT OF THE INVENTION

Figure 1A:
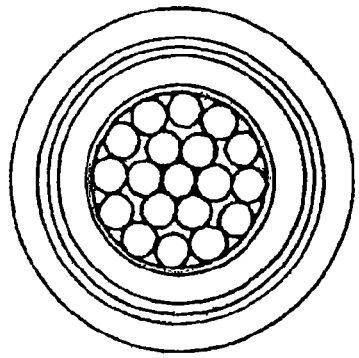
FIG. 1 is a perspective view and FIG. 1a is an end view of a known power cable.
Figure 1:
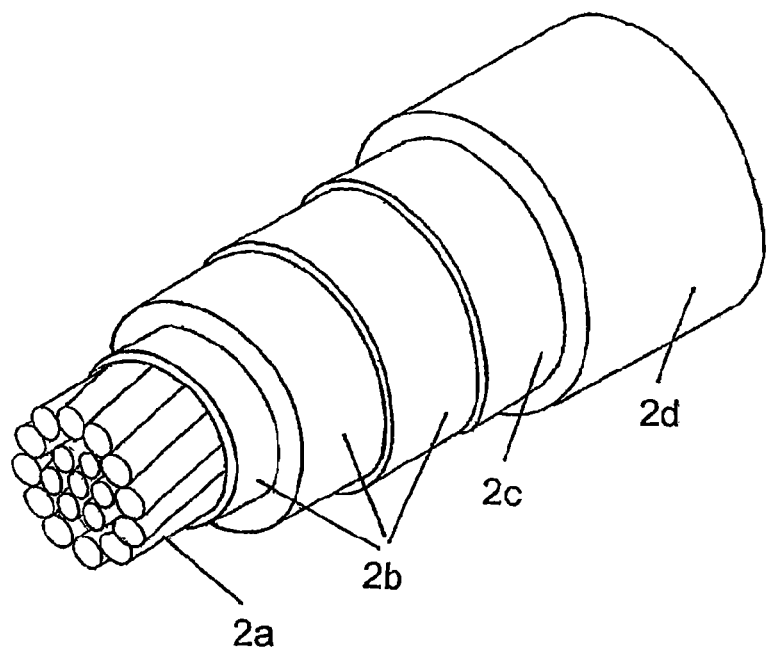

FIG. 1 provides an example of a typical power cable. From inside to outside, it comprises a central copper conductor 2a, semi-conductor and electrical insulation layers 2b, a metallic foil screen 2c and an external polymeric sheath 2d. The central conductor 2a has generally a stranded construction and a large section typically higher than 16 mm$^2$ and generally comprised between 50 mm$^2$ and 400 mm$^2$. Three phase power is provided by three such cables bundled together within the umbilical structure.

Figure 2A:
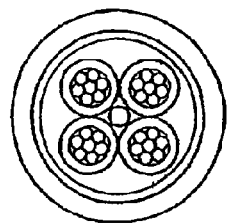
FIG. 2 is a perspective view and FIG. 2a is an end view of a known signal cable.
Figure 2:
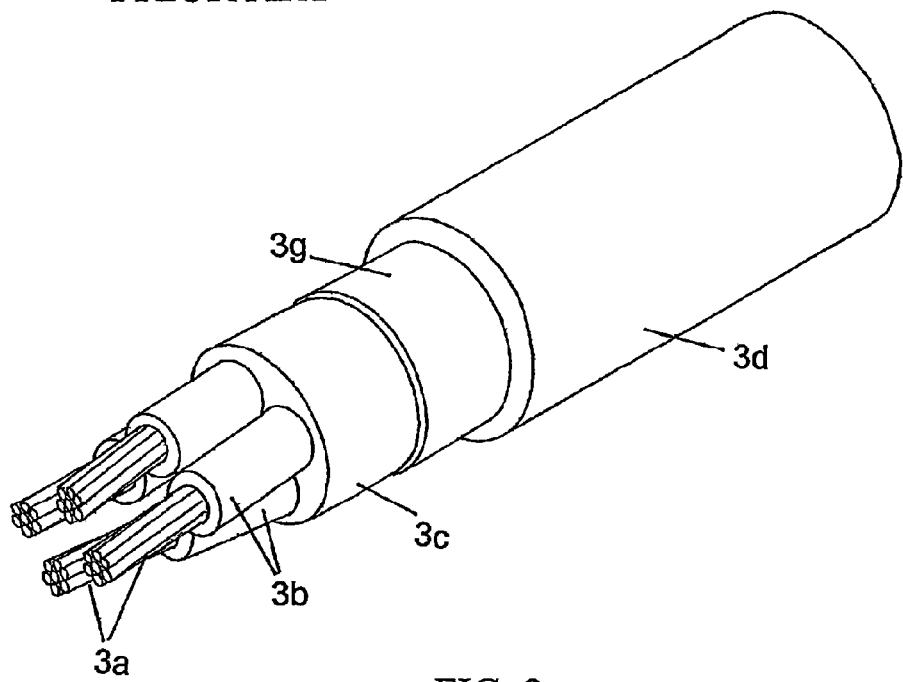

Signal cables generally comprise small section insulated conductors bundled together as pairs (2), quads (4) or, very rarely, any other number, said bundle being further oversheathed. An example of quad signal cable is illustrated in FIG. 2.

Figure 3:
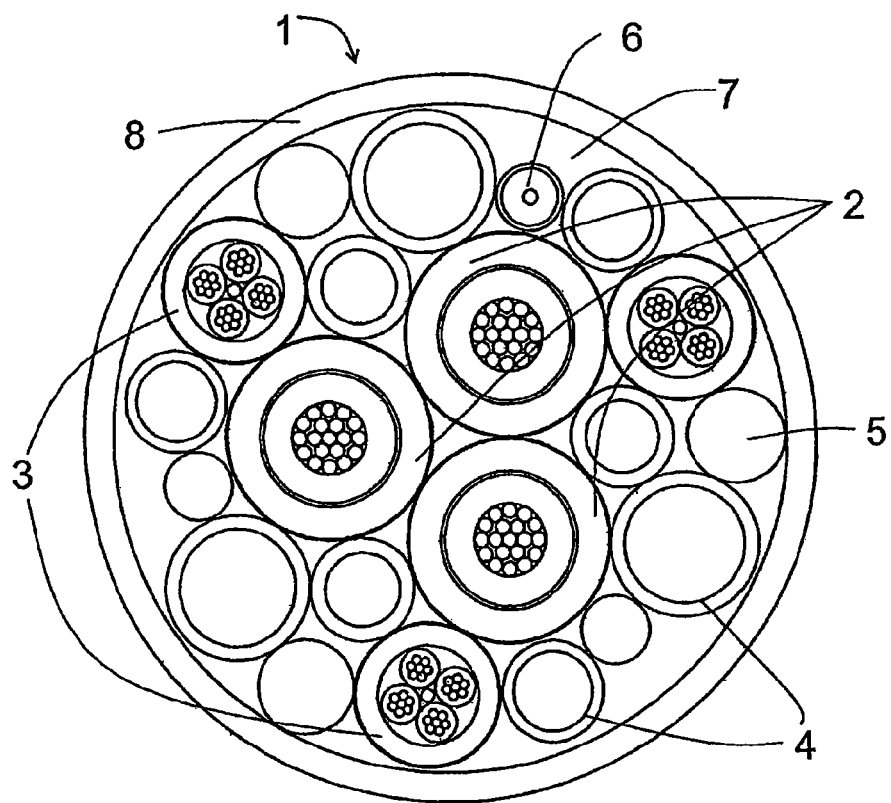
FIG. 3 is a cross-sectional view of an example of an umbilical.

An umbilical comprising at least an electrical power cable is called a power umbilical. An example of a power umbilical cross section is illustrated in FIG. 3. This power umbilical 1 comprises an assembly of functional elements including steel pipes or thermoplastic hoses 4, optical fiber cables 6, reinforcing steel, steel wire ropes or carbon rods 5, electrical power cables 2, and electrical signal cables 3 bundled together with filler material 7 and over sheathed by a polymeric external sheath 8. In this example, the three power cables 2 are bundled together close to the central axis of the umbilical. However, in some cases they may be positioned towards the outside of the umbilical bundle.

Although not represented in the example of FIG. 3, an umbilical may also comprises additional layers of helically wound steel armors such as those disclosed in U.S. Pat. No. 6,472,614. Such an umbilical is called an armored umbilical.

Figure 7:
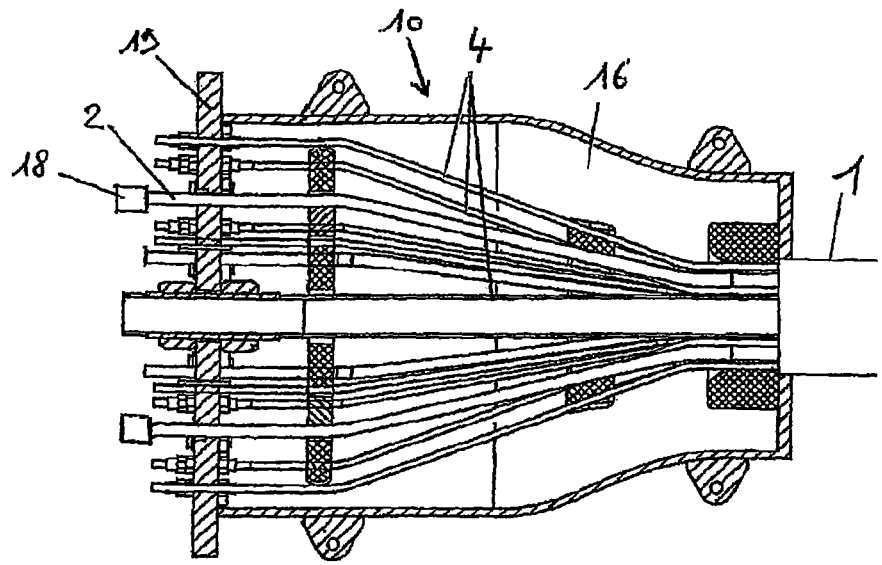
FIG. 7 is a side cross-sectional view of a known termination.

A known method of umbilical termination is illustrated in FIG. 7. The method comprises welding the steel tubes 4 forming part of the umbilical 1 to a steel bulkhead plate 19 through which the steel tubes 4 pass and which is mechanically attached to the hang-off termination 10. The power cables 2 also extend through the hang-off termination cavity 16 and through the bulkhead plate 19, but are not attached to the bulkhead plate 19. The interior cavity 16 of the termination 10 is filled with a compression resistant hard setting resin which is poured from a filler hole not represented. In this application, the resin is used to prevent radial displacements of the tubes 4 and of the cables 2 within the termination 10. Tensile loads (axial loads) are transmitted though the steel tubes 4 directly to the bulkhead plate 19 (tubes welded on the bulkhead plate) and thus to the termination 10. The power cables 2 are neither strongly anchored into the resin (risk of longitudinal/axial slip), nor attached to the bulkhead plate 19. This solution is not able to transmit to high tensile loads (axial loads) withstood by the high strength conductors of the power cables 2 to the termination 10. There is a risk of longitudinal slipping of the power cable 2 and of pulling out of the electrical connectors 18.

Figure 5:
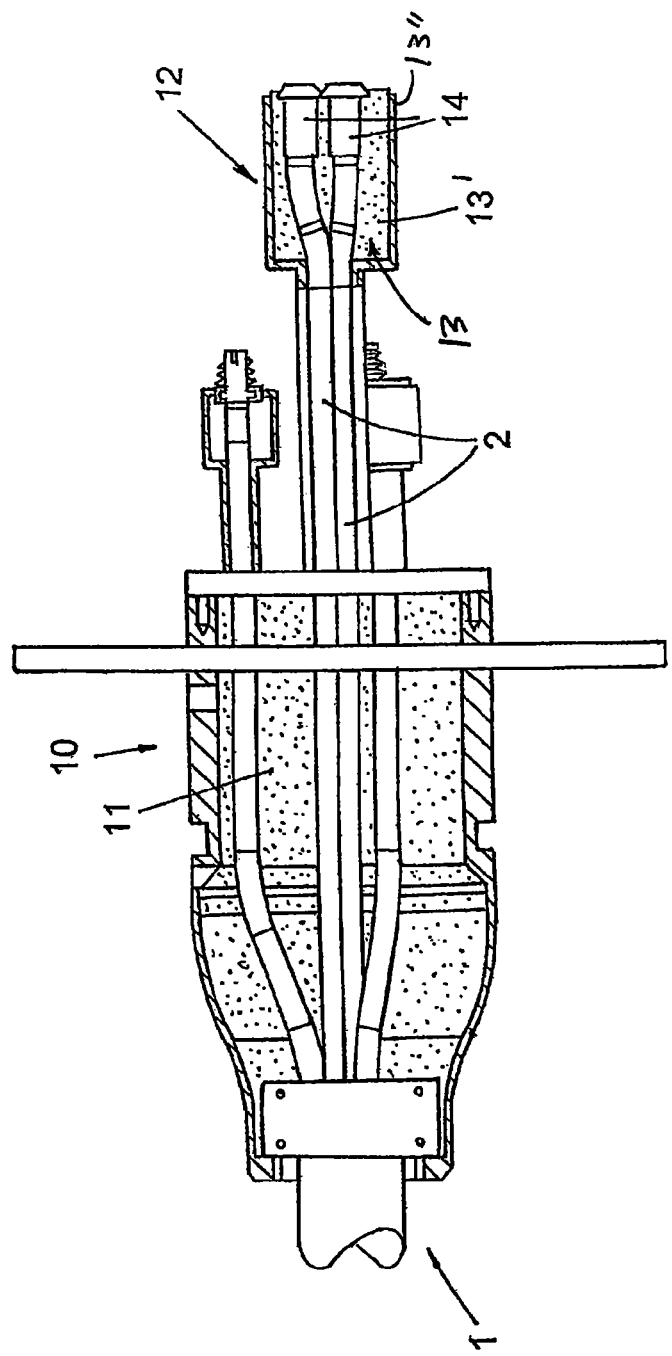
FIG. 5 is a side cross-sectional view of a termination according to a first embodiment of the invention (where the insulator is being used in compression)
Figure 6:
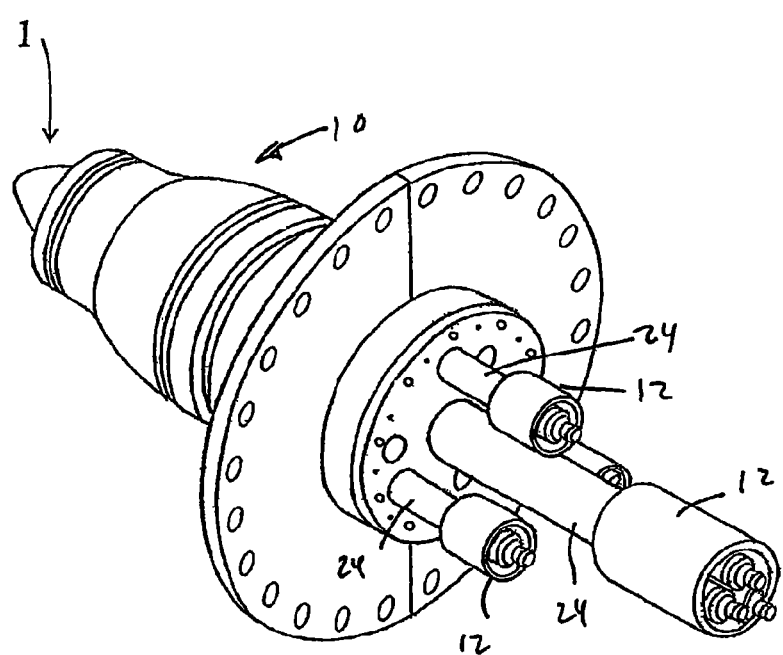
FIG. 6 is a perspective view of the termination according to a first embodiment of the invention (where the insulator is being used in compression)

An example of an umbilical hang-off termination according to the first embodiment of the present invention utilizing the insulator in compression is illustrated in FIG. 5. The primary hang-off termination 10 of the umbilical 1 includes the termination of steel tubes, steel armors and/or other tensile strength elements. Those elements are anchored within the primary hang-off termination according to well-know prior art solutions. The primary hang-off termination may be filled with a hard setting compound, such as an epoxy resin, as disclosed in WO08037962.

Figure 8:
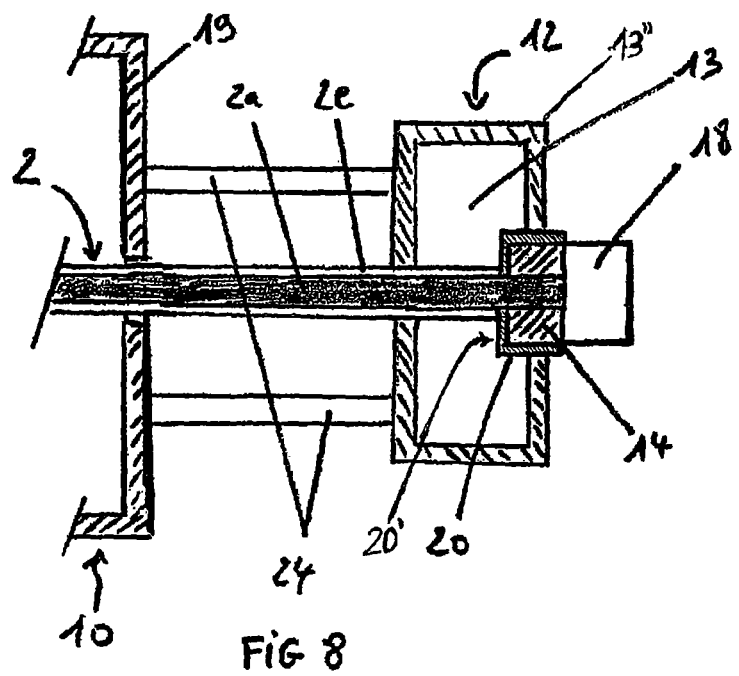
FIG. 8 is a side cross-sectional view of the secondary hang-off termination according to a first embodiment of the invention (where the insulator is being used in compression)

The power cables 2 extend through the primary hang-off termination 10 without being fully anchored to it. The upper end of each core of each power cable 2 is fully anchored to a secondary hang-off termination 12, as illustrated in FIG. 8. Each power cable core is strongly attached to a respective special ferrule 14. The ferrules 14 are anchored in the secondary termination 12 via a cavity 13 defined by a housing 13" and filled with a hard setting compound such as a resin 13'. A strong rigid frame 24 attaches the secondary hang-off termination 12 to the primary hang off termination 10.

Figure 4:
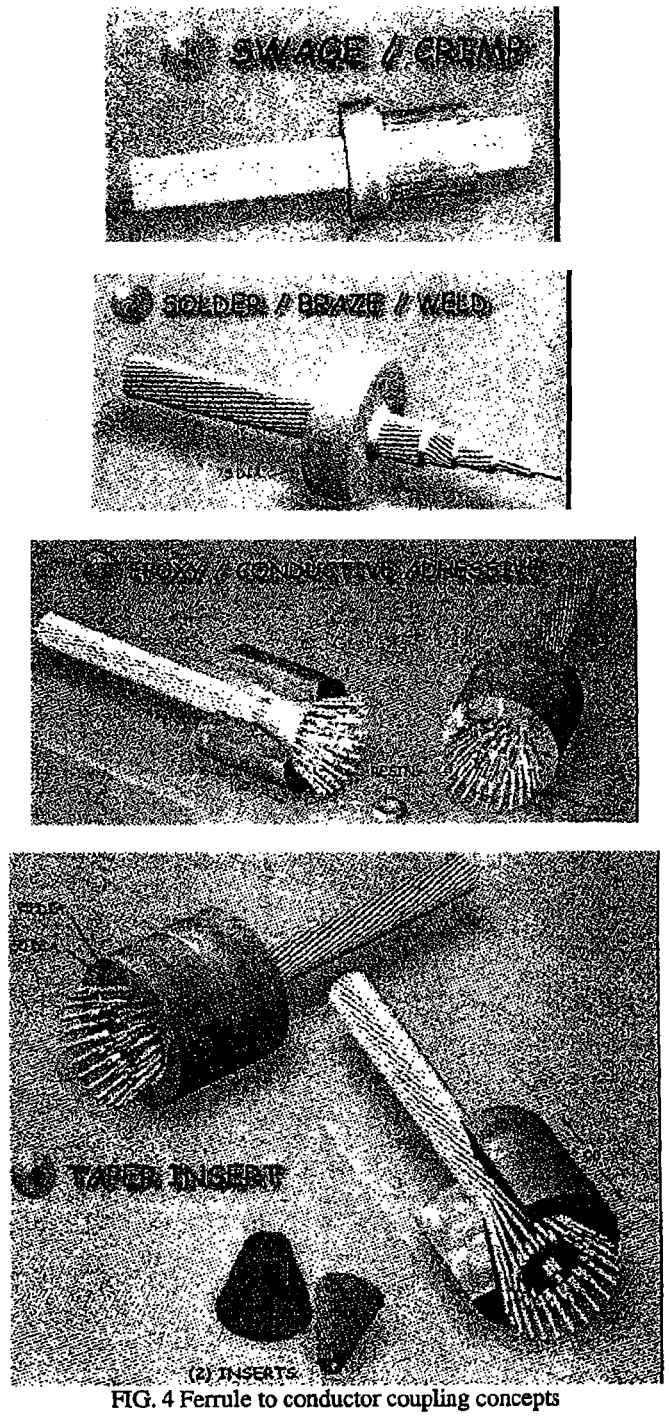
FIG. 4 shows examples of ferrules which are used for the present invention.

Examples of ferrules 14 suitable for the present invention are illustrated in FIG. 4. The illustrated ferrules differ as to their respective lengths and coupling concepts. The main coupling concepts illustrated are swaging/crimping, soldering/brazing/welding, using taper inserts and bonding (preferably with a conductive resin).

The special ferrule 14 is pre-fabricated to such an extent that only field splicing/coating will be required to establish the final full insulation properties, i.e. it will be a metallic base coated with insulating material that is applied in a laboratory or factory process. The metallic base of the ferrule 14 has preferably a tubular geometry and is directly fixed around and onto the conductor 2 by crimping, swaging, welding, soldering, brazing. The insulation layer 20 of the ferrule is a preferably a thick tubular layer strongly attached around the metallic base and made of high strength, high insulating materials such as glass, ceramic and PEEK. The first function of this insulation layer is to guarantee a safe electrical insulation between the conductor and the steel termination body. Indeed, the power cable insulation has to be locally removed before mounting the ferrule 14. Furthermore, the epoxy resin 13' which is cast in the termination may contain moisture and may not be insulating enough especially for high voltage applications. The integrated insulation layer 20 of the ferrule solves these problems and provides a safe insulation in the connection area. The second function of this insulating layer 20 is to transmit mechanical stresses withstood by the conductor 2 from the metallic base of the ferrule 14 to the resin 13' of the termination into which it is anchored, which is the reason why this insulation layer has to be made with high strength materials and has to be strongly fixed to the metallic base.

In the preferred embodiment represented in FIG. 8, the ferrule 14 is not fully embedded in the cavity 13 of the secondary hang-off termination 12 and extends outside said cavity 13. Most of the ferrule is inside the cavity 13 but a small length extends to the outside of the cavity through a hole drilled in the housing 13" of the secondary termination 12. The ferrule 14 is coated with a PEEK insulating layer (insulator) 20 on all its faces except the one toward the outside of the cavity 13. The metallic base (conductive part preferably made of aluminum) of the ferrule 14 is therefore electrically insulated from the resin 13 and from the metallic housing 13"

of the secondary hang-off termination 12. The high strength conductor 2a is also electrically insulated from the whole secondary termination 12 by its insulation layer 2e. The small extension of the metallic base of the ferrule and/or of the conductor 2a outside the cavity 13 of the secondary hang-off termination 12 makes it possible to mount easily an electrical connector 18 in contact with the part of the metallic base of the ferrule 14 and/or of the conductor 2a that extends outside. The pulling load applied by the conductor 2a is first transmitted to the ferrule 14, then to the insulator 20, then to the resin 13' and finally to the housing 13" of the secondary hang-off termination 12. The part of the insulator 20 which handles most of the load transmission is its face 20' which is oriented toward the conductor 2a. The face 20' of the insulator 20 is in compression between the resin 13' and the face of the ferrule 14 which is oriented toward the conductor 2a.

Figure 9:
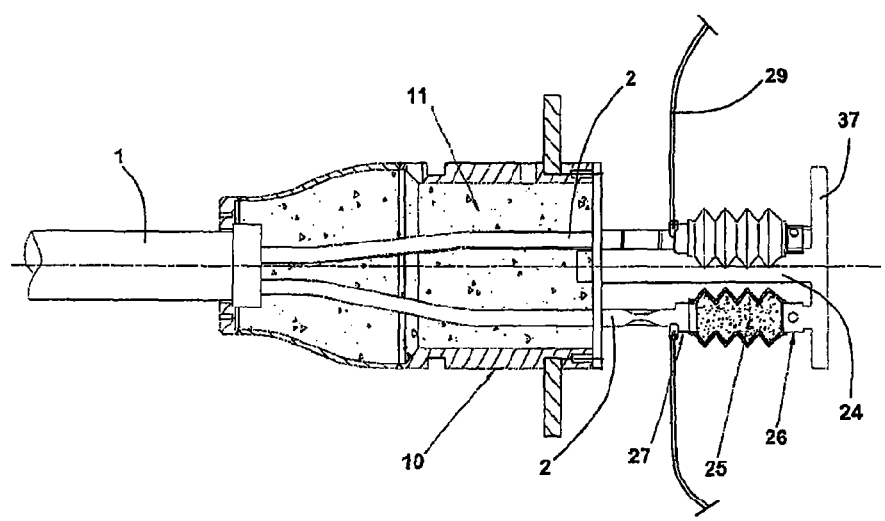
FIG. 9 is a side cross-sectional view of a termination according to a second embodiment of the invention (where the insulator is being used in tension)
Figure 10:
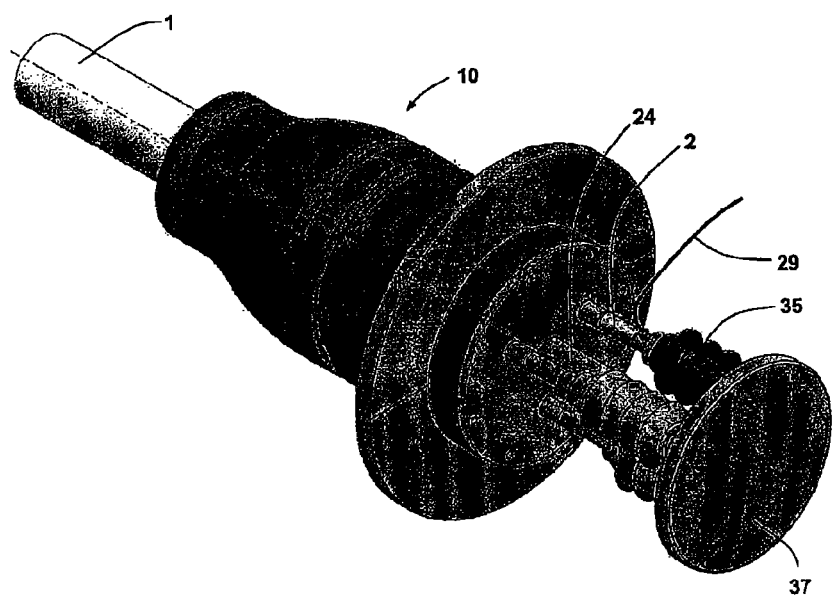
FIG. 10 is a perspective view of the termination according to a second embodiment of the invention (where the insulator is being used in tension)

An example of an umbilical hang-off termination according to a second embodiment of the present invention utilizing the insulator in tension is illustrated in FIG. 9. This shows the principle of how the insulator 25 is attached via an anchoring feature 26 to the secondary hang-off termination 37 and how the power cable 2 conductor is attached to the opposite end of the insulator using a connection ferrule 27. Access to the external electrical system is also made via the connection ferrule 27.

Figure 11:
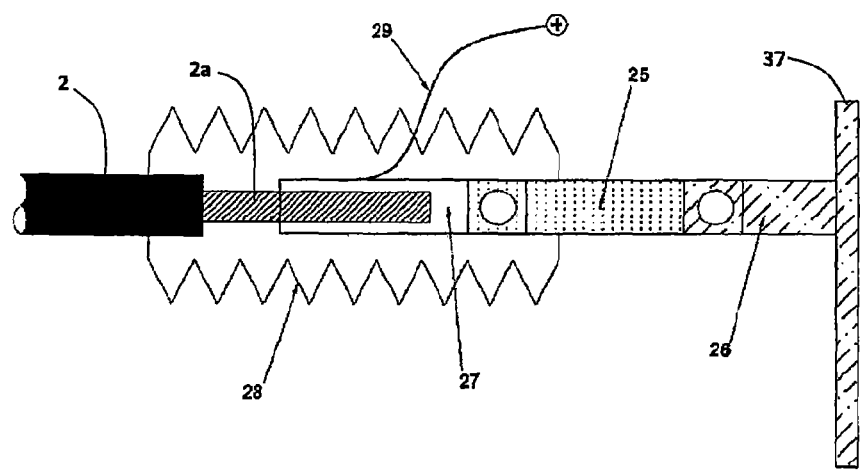
FIG. 11 is a cross-sectional representation of the region between the conductor and anchor point, according to the second embodiment of the invention.

An example of how the conductor connects to the secondary hang-off location via an insulator according to the second embodiment of the present invention utilizing the insulator in tension, is illustrated in FIG. 11. This shows the principle of how the insulator 25 is attached via an anchoring feature 26, and how the power cable conductor 2 is attached to the opposite end of the insulator 25 using a connection ferrule 27. Access to the external electrical system 29 is also made via the connection ferrule which itself is electrically isolated by means of an insulation bushing 28 from the external environment.

Figure 12:
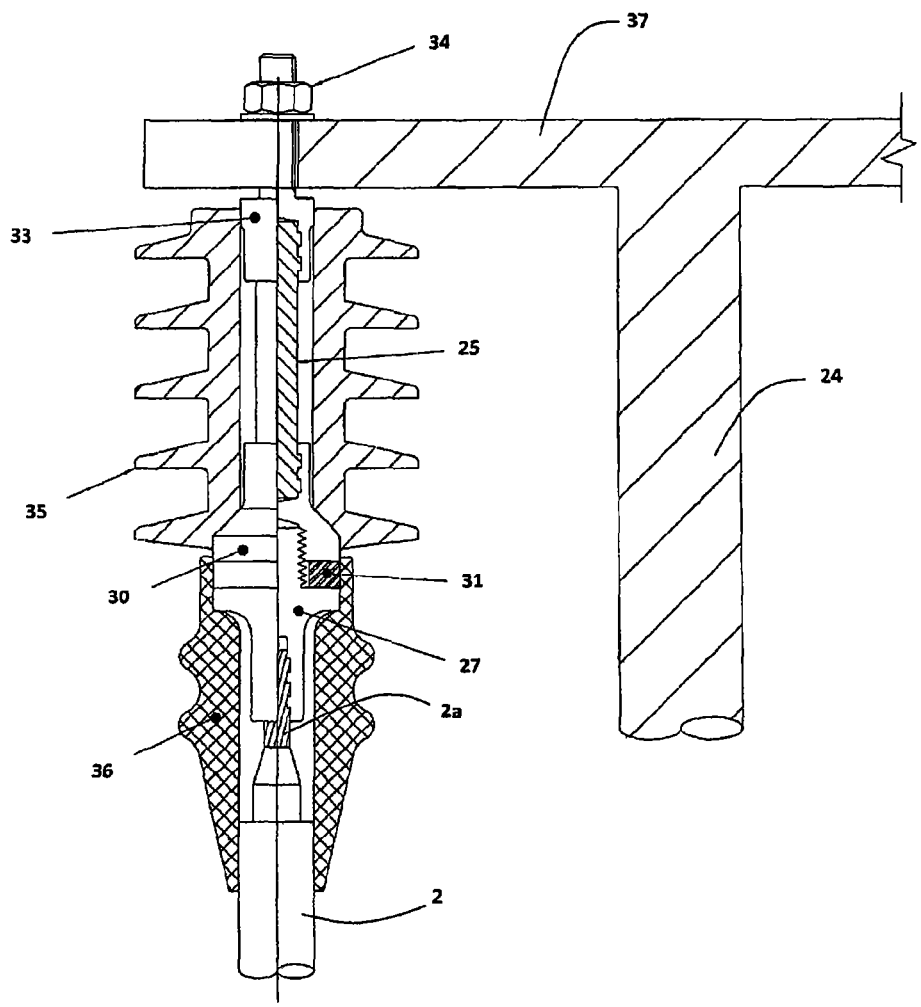
FIG. 12 is a part sectioned drawing of the insulator under tension according to the second embodiment of the invention.

FIG. 12 provides more detail of the insulator 25 in tension. The attachment of the cable 2 to the connection ferrule 27 which for purposes of illustration is shown crimped to the conductor. However, other methods of attachment could also be used such as swaging, welding, soldering, brazing, CAD-welding, bonding (using a conductive adhesive) or a basket socket with conducting wedge(s).

The ferrule 27 is shown with a threaded section which will screw into the corresponding lower attachment 30 to the insulator 25. Other methods of mechanical coupling between the ferrule and insulator could be used.

Figure 13:
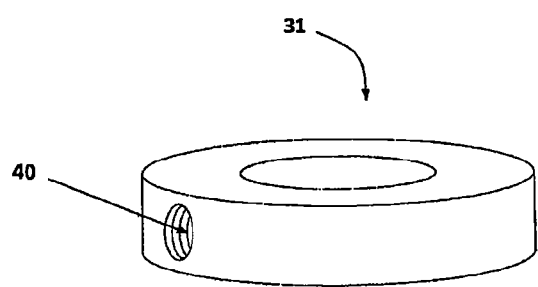
FIG. 13 is an isometric view showing the connecting bush (31) that locates between the ferrule and insulator fitting according to a second embodiment of the invention (where the insulator is being used in tension).

In this particular arrangement a contact bush 31 is shown to be fitted between the ferrule 27 and the insulator 25. This contact bush is the access point to the electrical system but could conceivably be part of the insulator or ferrule 27 itself. The physical form of this contact may be achieved in a number of ways, but for clarity the bush is provided with a threaded hole 40 to accommodate a screwed terminal which is normal to the cable axis, giving the appearance therefore of a "T" type connection. The bush is made from a high conductivity metal such as copper or aluminum, and FIG. 13 shows an isometric view of the item used in this particular example.

The insulator 25 itself is shown as a unit which has a number of parts. The insulation material has to be capable of having sufficient mechanical strength to support the tensile loading for the specific application. It requires also to have high dielectric strength and being of sufficient length to accommodate the voltage level. Material such as resin bonded fiber rod having metallic fittings securely attached to each end could be considered, similar to that shown in U.S. Pat. No. 3,898,372. Such suitable insulators are used in overhead onshore lines but, from what we know, have never been used in subsea umbilical terminations. The lower metal fitting 30 is shown with the threaded hole to accommodate the screw thread on the ferrule 27 after first positioning the contact bush between them.

This arrangement will make easier assembly of the second embodiment of invention, thereby allowing the physical attachment of the conductor 2 to ferrule 27 to be made autonomously without having all parts in place. The upper metal fitting 33 is shown with an external threaded section at the top, which fits through the secondary hang-off 37, and this can be adjusted for length using a nut 34 installed above the hang-off. Within this region other devices could be installed to check or monitor load sharing between individual cables, and if required incorporate a tensioning device/compensator such as a spring. A weathershed 35 is shown over the insulator similar to the insulator in U.S. Pat. No. 3,898,372, which is made from an elastomeric material slid over the top metallic fitting 33 and insulator material 32. Consideration should be given to the lower 'electrically live' fitting 30 to insulator interface, concerning electrical corona, and it may be necessary to include localized protection in the form of bonded semiconductive rubber, similar to that described in U.S. Pat. No. 6,388,197 for overhead onshore lines.

Also shown over the cable 2 to ferrule 27 interface is a stress relieving cone (36), which is intended to relieve the electrical stress in the cable insulation at the termination of the insulation shielding and earth breakout. This will have to be adapted to suit the terminal arrangement for connection to the electrical system.

Figure 14:
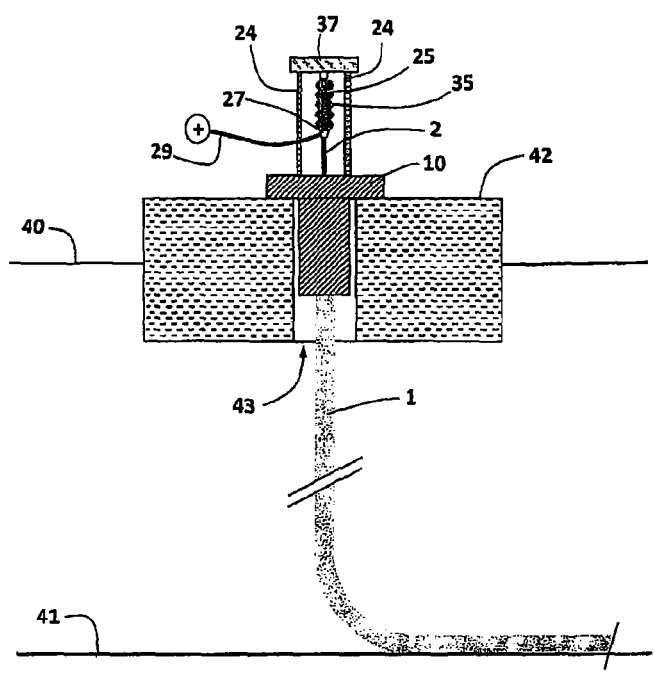
FIG. 14 is a shematic general view of a riser umbilical attached to a surface unit.

FIG. 14 is a shematic general view of a riser umbilical 1 attached to a surface unit 42 employing a hang-off termination according to the second embodiment of the present invention. Surface unit 42 can be an oil & gas offshore platform or floating unit, Spar, Tension Leg Platform (TLP), semi-submerssible platform, Floating Production Storage and Offloading unit (FPSO), special vessel, floating wind mill or any other type of surface unit.

The umbilical 1 is in catenary configuration between the surface unit 42 at the sea surface (topside) 40 and the sea floor (sea bed) 41. The topside termination of the umbilical 1 comprises the following components: a primary hang-off termination 10 which is anchored to the surface unit 42, a secondary hang-off location (e.g. a plate) 37, and a rigid frame 24 disposed between and spacing primary hang-off termination 10 and the secondary hang-off termination location 37. The power cable 2 extends almost freely through the primary hang-off termination 10 without being anchored to it. The top end of the power cable 2 is attached to the bottom end of the insulator 25 by the ferrule 27. The top end of the insulator 25 is attached to the secondary hang-off location 37. The tensile load (pulling load) applied by the top end of the power cable high strength conductor is taken by the secondary hang-off location 37 via the insulator under tension 25. This tensile load is transmitted to the surface unit 42 via the frame 24 which works under compression. The electrical junction between the power cable 2 conductor and the external electrical system is made via an electrical cable 29 which is connected to the power cable conductor at or close to the ferrule 27. The insulator 25 has two functions: to transmit the tensile load from the power cable 2 conductor to the secondary hang-off location 37; and to electrically insulate the power cable 2 conductor and the termination arrangement. The insulator 25 has to be designed to handle the tensile load and the voltage level of the power cable 2, such design rules being well known in the overhead lines field. The junction cable 29 is not under tension.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A subsea umbilical riser attached to a surface unit comprising:
at least one electrical power cable, said power cable comprising a high strength conductor having a section higher than 16 mm$^2$, an electrical conductivity higher than 35% IACS, a tensile yield strength higher than 170 Mpa and a density smaller than 3500 kg/m$^3$; and
a hang-off termination configured to connect said power cable to an installation, the hang-off termination comprising a ferrule coupled to an end of said power cable said ferrule being coupled to an insulator that is in compression or in tension when said hang-off termination connects said umbilical to said installation, said insulator being coupled to said hang-off termination and having sufficient mechanical strength to transmit to said hang-off termination the pulling load applied to the top end of said high strength conductor.

2. The umbilical of claim 1, further comprising a plurality of power cables each connected to the hang-off termination.

3. The umbilical of claim 2, wherein the hang-off termination comprises a respective ferrule on each of the power cables, each ferrule extending around a respective portion of a power cable and each ferrule being operable to provide a support system for the respective conductor.

4. The umbilical of claim 1, wherein the ferrule is comprised of a resin conglomerate with high compressive strength.

5. The umbilical of claim 4, further comprising a plurality of power cables each connected to the hang-off termination.

6. The umbilical of claim 1, further comprising additional elements within and extending through the umbilical, the elements being selected from the group consisting of electrical cables, optical cables, optical fiber cables, pipes, and hoses.

7. The umbilical of claim 6, wherein the elements extending through and along the umbilical are bundled together; filler material is around the bundled together elements, and an external sheath is disposed over the filler material and the bundled together elements.

8. The umbilical of claim 1, wherein said ferrule is partially embedded in said insulator and partially resides in a cavity defined by a housing.

9. The umbilical of claim 1, wherein said ferrule is coupled at one end thereof to a respective end of said insulator, said insulator having an opposite end configured for connection to said installation.

10. The umbilical of claim 9, further comprising a primary hang-off termination and a rigid frame, said rigid frame extending between and spacing said primary hang-off termination and a hang-off location, said rigid frame being in compression when said insulator is coupled to said hang-off location.

11. The umbilical of claim 10. wherein said hang-off location comprises a plate.

12. The umbilical of claim 9, further comprising a wheathershed surrounding said insulator.

13. The umbilical of claim 1, wherein said ferrule is threadably coupled to said insulator.

14. The umbilical of claim 1, wherein the insulator is in tension.

15. The umbilical of claim 1, wherein the insulator is in compression.

* * * * *